(12) United States Patent
Schering et al.

(10) Patent No.: US 7,558,688 B2
(45) Date of Patent: Jul. 7, 2009

(54) ANGLE CALIBRATION OF LONG BASELINE ANTENNAS

(75) Inventors: Roy Schering, Melbourne, FL (US); Wayne John Gordon, Melbourne, FL (US); Donald Richard McMillan, Indialantic, FL (US); David Curtis Lennon, Melbourne, FL (US); Marc S. Adams, Melbourne, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/737,924

(22) Filed: Apr. 20, 2007

(65) Prior Publication Data

US 2008/0259317 A1    Oct. 23, 2008

(51) Int. Cl.
*G01C 17/38* (2006.01)
(52) U.S. Cl. ..................... 702/92; 356/139.04
(58) Field of Classification Search ............. 702/92–95, 702/104; 343/711–714, 757, 761–762; 701/3, 701/29, 34, 220–221
See application file for complete search history.

(56) References Cited

U.S. PATENT DOCUMENTS

| | | | |
|---|---|---|---|
| 5,485,156 A * | 1/1996 | Manseur et al. ............... 342/77 |
| 5,977,906 A | 11/1999 | Ameen et al. |
| 6,005,513 A * | 12/1999 | Hardesty ............... 342/357.09 |
| 6,104,346 A | 8/2000 | Rudish et al. |
| 6,313,788 B1 | 11/2001 | Wilson |
| 6,594,600 B1 * | 7/2003 | Arnoul et al. ............... 702/94 |
| 6,806,837 B1 | 10/2004 | Saucier et al. |
| 6,925,403 B2 * | 8/2005 | Nowak ............... 702/94 |
| 6,944,542 B1 * | 9/2005 | Eschenbach ............... 701/220 |
| 6,950,073 B2 * | 9/2005 | Clymer et al. ............... 343/713 |
| 7,015,857 B1 | 3/2006 | Pozgay |
| 2003/0028340 A1 * | 2/2003 | Brunstein ............... 702/94 |
| 2003/0098972 A1 * | 5/2003 | McMillan et al. ....... 356/139.03 |
| 2004/0111212 A1 * | 6/2004 | Broeck ............... 701/201 |
| 2006/0114157 A1 | 6/2006 | Kolanek et al. |
| 2007/0046448 A1 * | 3/2007 | Smitherman ............... 340/431 |
| 2007/0191999 A1 * | 8/2007 | Hunter et al. ............... 701/3 |

FOREIGN PATENT DOCUMENTS

WO    WO 2005/010551 A1    2/2005

\* cited by examiner

*Primary Examiner*—Carol S Tsai
*Assistant Examiner*—Mary C Baran
(74) *Attorney, Agent, or Firm*—Robert P. Lenart, Esq.; Pietragallo Gordon Alfano Bosick & Raspanti, LLP

(57) ABSTRACT

A method for calibrating a sensor mounted on an aircraft includes the steps of: using an optical device to create reference points which define a reference line that is parallel to both horizontal and vertical planes of the sensor, and using the reference line to calibrate the sensor with respect to a reference coordinate system.

14 Claims, 4 Drawing Sheets

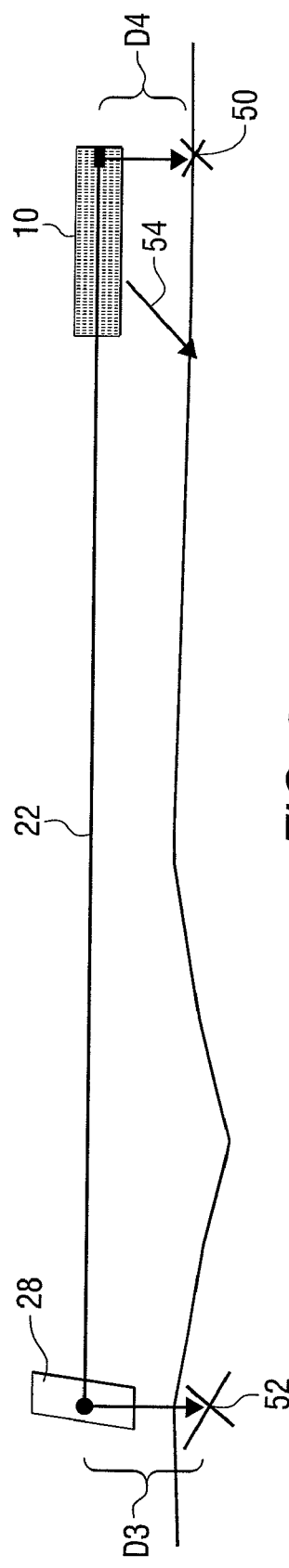
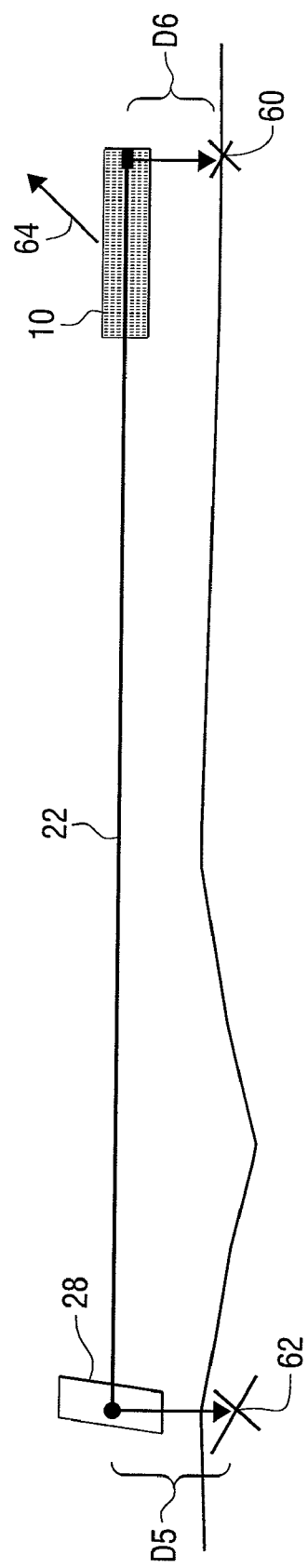
FIG. 3
FIG. 4

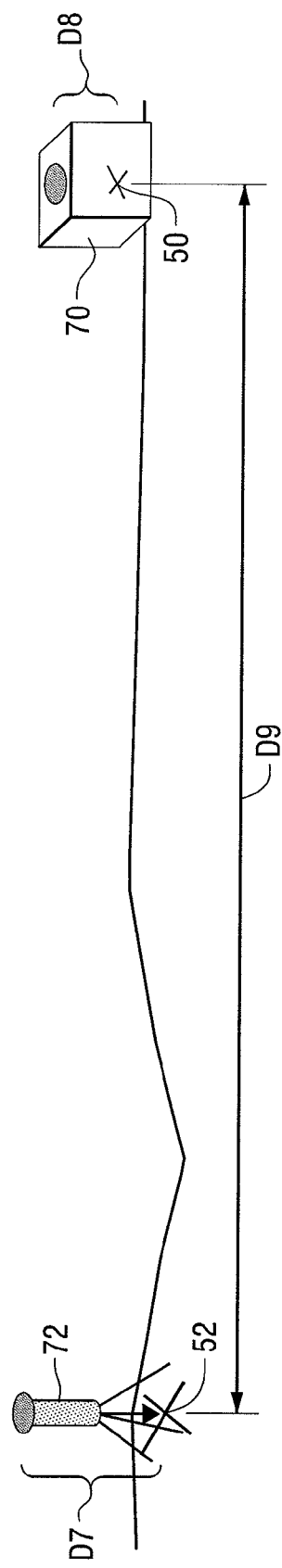
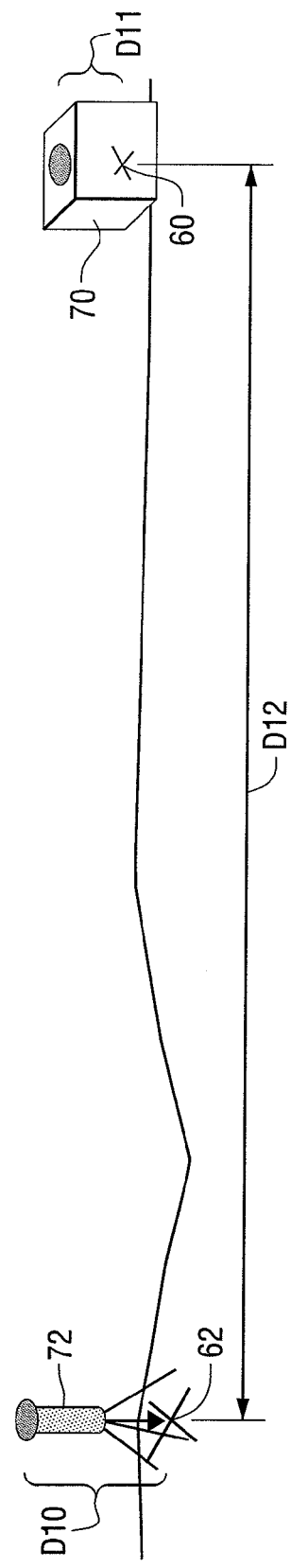

ANGLE CALIBRATION OF LONG BASELINE ANTENNAS

STATEMENT OF GOVERNMENT INTEREST

This invention was made under Contract No. D05636270. The United States Government has rights in this invention under the contract.

FIELD OF THE INVENTION

This invention relates to methods for calibrating sensors, and more particularly to methods for calibrating sensors such as antennas mounted on aircraft.

BACKGROUND OF THE INVENTION

Inertial reference systems (IRS) are used to provide inertial navigation data for aircraft navigation. Various types of sensors can be mounted on the aircraft. An airborne sensor that is used for targeting and localization using the navigational system of the host aircraft must be calibrated to the inertial references of the aircraft. An inertial navigation unit within an aircraft provides attitude information (i.e., roll, pitch and heading) in addition to position and velocity information. Long baseline sensors report detections with respect to their coordinate axes (e.g., angle-of-arrival at the antenna). The orientation of the sensor's coordinate axes with respect to the inertial navigation unit's attitude angles must be determined in order to accurately convert sensor detections to recognized earth fixed coordinates (e.g., latitude, longitude, and altitude).

For sensors that use the angle-of-arrival of a received signal for location determination (e.g., as performed by radars and phase interferometers), the location accuracy is limited by the accuracy of the angle-of-arrival measurements. Recent technology improvements in inertial navigation units (INU) have provided the opportunity for dramatic improvements in the accuracy of sensor angle measurements. However, these improvements can only be realized if the INU coordinate frame can be precisely aligned with the sensor's coordinate frame. This is often very difficult to accomplish with traditional alignment techniques.

Traditional alignment techniques fall into three general categories:
1. Mechanical control of the physical alignment errors between the sensor and INU;
2. Measurement of the physical misalignment between the sensor and the INU chassis (e.g., by using a laser); and
3. Iterative measurements of the sensor computed with respect to objects having known locations to determine misalignment.

For the mechanical control technique, costly and stringent tolerances of the airborne sensor system are maintained during engineering, manufacturing and maintenance. There are practical physical limitations to the accuracy because the mechanical alignment is subject to tolerance error stack-up (e.g., adding up the mechanical tolerance, or misalignment) between the sensor antenna and the mounting point of the antenna on its fuselage (i.e., the fuselage and the INU). A variation of the mechanical control scheme includes a second INU mounted on the sensor, but it is subject to similar limitations and error stack-up.

The second technique (measurement of the physical misalignment) involves measurements of distances between the sensor and INU using lasers and/or mirrors for precision angle measurements. This technique is costly and time-consuming because the INU is carried inside the aircraft's fuselage and the sensor antenna is mounted external to the fuselage, so the measurement set-up is relatively complex because the observations are not direct.

Iterative measurement, the third technique, involves using the installed sensor to locate objects that have known geolocations. The observed geolocation errors are then used to "back out" the misalignment. Because the geolocation errors are driven by several factors, including the misalignment in more than one axis (e.g., pitch, roll and yaw), this is an iterative and time-consuming process, and especially if airborne operations are required to take the measurements.

There is a need for an alignment technique that achieves greater accuracy without the drawbacks associated with the traditional techniques discussed above.

SUMMARY OF THE INVENTION

This invention provides a method for calibrating a sensor mounted on an aircraft including the steps of: using an optical device to create reference points which define a reference line that is parallel to both horizontal and vertical planes of the sensor, and using the reference line to calibrate the sensor with respect to a reference coordinate system.

The reference coordinate system can be established by an inertial navigation system.

In one aspect, the sensor can be calibrated with respect to a reference coordinate system by sending an "orient" message to an inertial navigation unit reflecting corrections that force the inertial navigation unit to report its heading and pitch in a coordinate frame of the sensor.

In another aspect, the sensor can be calibrated with respect to a reference coordinate system by adding corrections to heading and pitch angles reported by an inertial navigation unit.

The optical device can create reference points which define the reference line by directing an optical beam through first and second irises connected to the sensor, and using the optical beam to establish the first and second reference points.

The locations of the first and second reference points can be used to determine the heading and pitch of the reference line.

BRIEF DESCRIPTION OF THE DRAWINGS

FIG. 3 is a schematic representation of sensor calibration using a starboard side geometry.

FIG. 4 is a schematic representation of sensor calibration using a port side geometry.

FIG. 5 is a schematic representation of laser starboard geolocation measurements.

FIG. 6 is a schematic representation of laser port geolocation measurements.

DETAILED DESCRIPTION OF THE INVENTION

This invention provides a method for accurately determining the difference between a long baseline antenna's orientation (i.e., pitch angle and heading angle) and the orientation (i.e., pitch angle and heading angle) of an aircraft's inertial navigation unit. This difference can be applied to the sensor's measurements as they are collected or can be sent to the inertial navigation unit so that it reports attitude in an inertial coordinate frame that is precisely aligned with the sensor's coordinate frame. No mechanical adjustments to the inertial reference system or the sensor's antenna are required when this alignment procedure is utilized.

In a first aspect, this invention provides a method and apparatus for calibrating a sensor using a laser (or other optical system) to create a reference line that is parallel in both the horizontal and vertical planes of the sensor (for example, a radar antenna). The reference line serves as a baseline having a length that is much longer than the width of the sensor. For example in one implementation of the invention, the baseline was approximately 1500 ft or ¼ mile for the alignment of a test sensor.

Points on the reference line are projected onto the ground to establish reference points, and the coordinates of the reference points are obtained. In one example, the reference points can be located using plumb bobs extending from locations on the reference line, and the reference points can be physically marked. The coordinates of the reference points can be obtained by using state-of-the-art global positioning system (GPS) units.

These coordinates can then be converted into precise heading and pitch values. Since the reference line is parallel to both the horizontal and vertical planes of the sensor, this process determines the true attitude (e.g., heading and pitch) of the sensor with great accuracy. This true attitude information is compared to the attitude information of the host vehicle's mission navigation system (e.g., an inertial navigation unit (INU)). An alignment correction can then be directly determined by comparing the true attitude of the sensor with the attitude generated independently by the INU using advanced gyro compassing techniques. The corrections can be applied within the INU by supplying an updated "orient" message or they can be applied to the attitude information reported by the INU in the form of additive heading and pitch delta angles.

Figure 1:
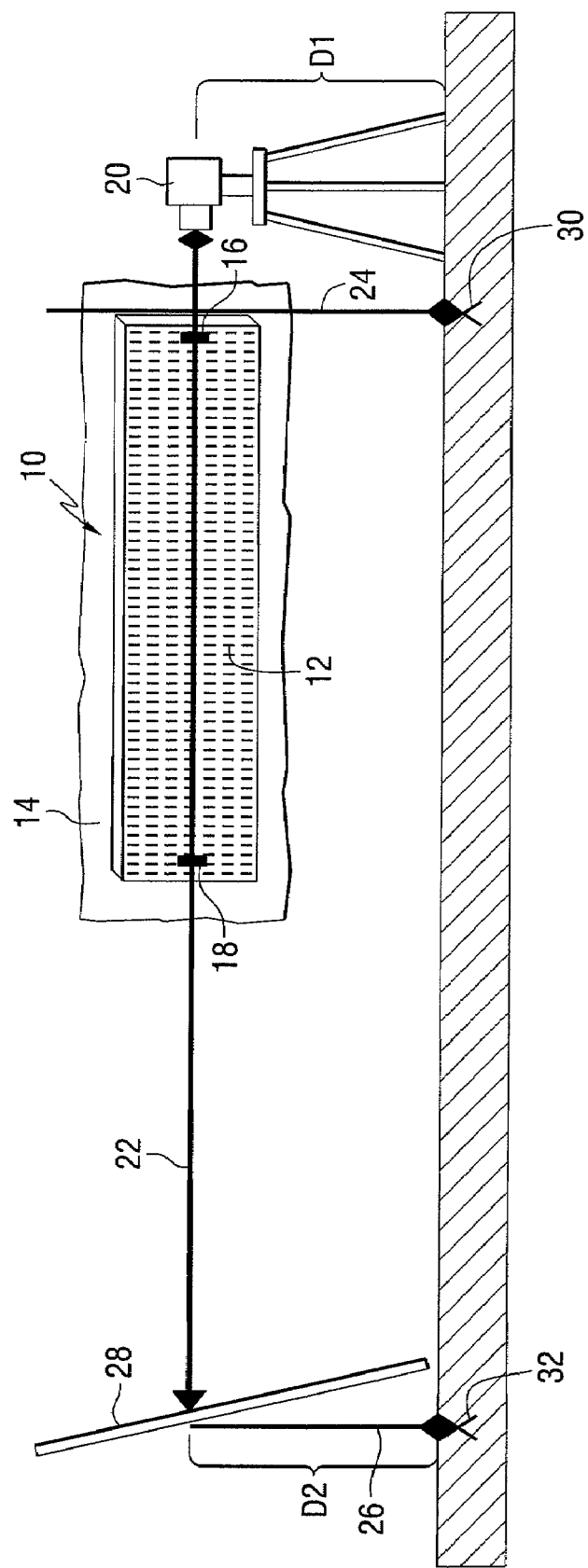
FIG. 1 is a schematic representation of a sensor calibration system in accordance with an aspect of the invention.

FIG. 1 is a schematic representation of a sensor calibration system. A sensor 10, which in this example is a planar array of antenna elements 12, is mounted on the fuselage 14 of a host vehicle, in this case an aircraft. The first and second irises 16 and 18 are mounted on the antenna array in a known spatial relationship to the array. A laser or other optical device 20 is used to generate a beam 22 that passes through the irises. Lines 24, 26 can be dropped from the beam to the ground at points along the beam. For example, a first line 24 is dropped from a location on the beam near the antenna. A target 28 can be placed at an arbitrary location along the beam and a second line 26 can be dropped to the ground from the point at which the beam strikes the target. The points at which the lines strike the ground become first and second reference points 30, 32. The irises are apertures that can be located in structures which are mounted on the array and position the apertures a known distance from the plane of the array elements.

The distances D1 and D2 from the reference points to the beam are then measured. The geographic locations of the first and second reference points can be determined using a GPS unit. Once the locations of the reference points are known, the heading and pitch of the reference line can be determined using known techniques. The differences between the measured heading and pitch of the reference line and the heading and pitch reported by the INU are the heading and pitch corrections. These can be applied either by sending an "orient" message to the INU reflecting the corrections which will force the INU to report its heading and pitch in the coordinate frame of the sensor or by adding the correction to the heading and pitch angles reported by the INU. The first option can be used only if the sensor antenna is aligned within approximately one degree of the aircraft's fuselage or, if not, the INU is not used to navigate the aircraft (since it would report erroneous attitude to the flight crew). The second option can be used in all circumstances.

This process results in a sensor system with higher accuracy and lower calibration costs than sensor systems calibrated using traditional methods. Tests on an example sensor have shown that the true heading of the sensor antenna can be determined to an accuracy of 0.002 degrees. This technique can be used for any long baseline antenna array where irises can be mounted a fixed distance from the forward and aft elements of the antenna array.

Figure 2:
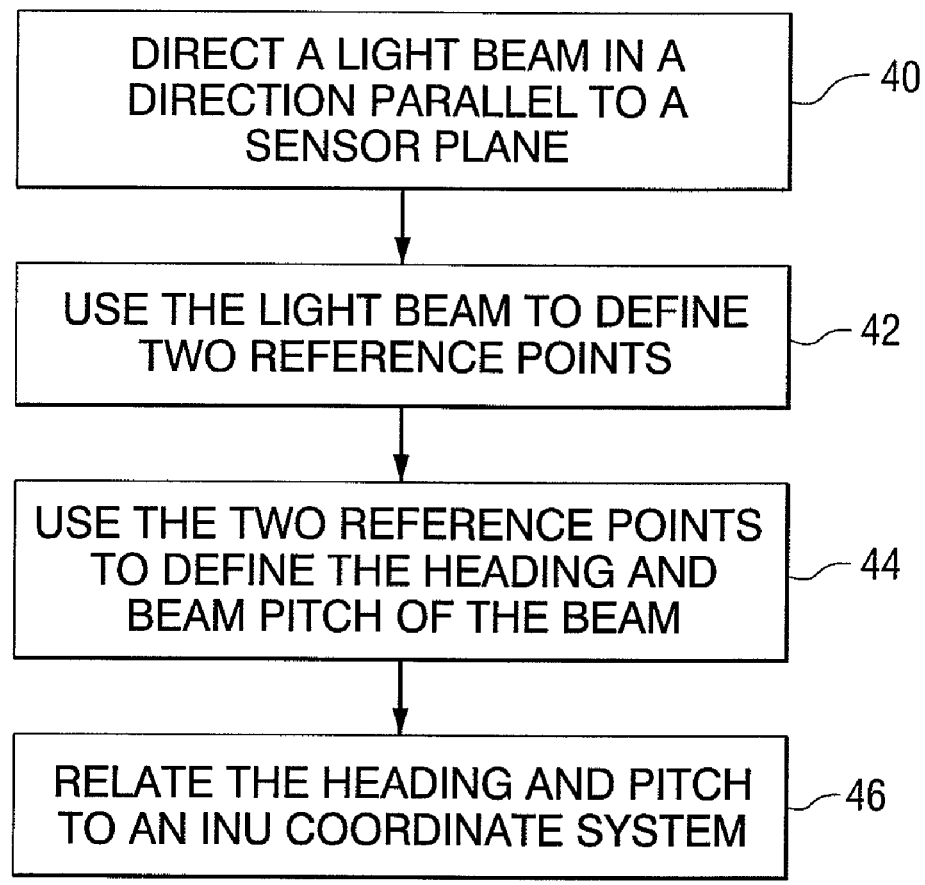
FIG. 2 is a flow diagram of one example of the method of this invention.

FIG. 2 is a flow diagram of one example of the method of this invention. The method begins (block 40) by orienting a laser beam in a direction that is parallel to both a horizontal plane of a sensor and a vertical plane of the sensor to establish a reference line. The laser beam is used to establish two reference points (block 42). The geolocation of the references points is used to determine the heading and pitch of the reference line (block 44). The orientation of the reference line is compared with a reference frame of a navigation unit (block 46). Then the orientation of the reference line is used to calibrate the sensor with respect to an INU on the aircraft.

In one example, an optical beam can be aligned through the use of two optical irises attached to the face of a radar antenna near the forward and aft ends. A laser or optical system projects a line from the antenna face to the target. In one example, the target is approximately 1500 ft. away. The optical iris can be precision machined to fit into existing slots in the antenna face.

In an example, an antenna mounted on an aircraft has been calibrated for use with an LN 260 inertial navigation system and two system navigation units (SNU 84's). The aircraft was towed to an antenna alignment spot on a taxiway, and a radome covering the antenna was lowered. The antenna was rotated to face starboard and the antenna was leveled. Navigation data was collected for 30 minutes while the aircraft was stationary at an alignment spot.

In this example, four irises were mounted on the antenna. The antenna included a plurality of slots, and the irises were mounted 11 slots from the top and bottom near the front and rear of the antenna, while the antenna was facing the starboard direction.

A laser was then positioned to produce a beam that passed through the center of two of the alignment irises, in this case, the two irises that were closest to the bottom of the antenna. This example used adjustable irises to make the spot size on the target more well defined and to create diffraction rings which could be used to more precisely locate the center of the spot. To perform the laser alignment, a target was positioned to be illuminated by the laser. Then the center of the laser illumination spot on the target was marked. Reference points were established on the ground as described in FIG. 1.

Then the antenna was rotated to face the port direction. The measurements were repeated using the bottom set of irises on the port side (these are the set of irises that were mounted 11 slots from the top of the antenna when the antenna was facing starboard). Again, reference points were established on the ground.

Two GPS systems were used to simultaneously determine the location of the reference points established when the antenna was pointing port. Data was collected for more than 40 minutes.

The simultaneous GPS locations of the reference points established when the antenna was pointed starboard were also taken. With this procedure, the head and pitch of reference lines for the antenna in both the starboard and port positions were established.

The test set-up for the above example is illustrated in FIGS. 3-7. FIG. 3 is a schematic representation of sensor calibration using a starboard side geometry. An antenna 10 is mounted on an aircraft (not shown). A laser beam 22 was projected through two irises mounted on the antenna so that the beam was parallel to a vertical and horizontal plane of the antenna. A plumb bob was dropped from a first point on the beam near one end of the antenna to establish a first reference point 50 on the ground. A plumb bob was dropped from a second point on the beam near a target 28 to establish a second reference point 52 on the ground. The distance D3 from the second reference point to the beam was measured at 1.47 m. The distance D4 from the first reference point to the beam was measured at 0.9509 m. The boresight 54 of the antenna points away from the starboard side of the aircraft.

FIG. 4 is a schematic representation of sensor calibration using a port side geometry. An antenna 10 is mounted on an aircraft (not shown). A laser beam 22 was projected through two irises on the antenna so that the beam was parallel to a vertical and horizontal plane of the antenna. A plumb bob was dropped from a first point on the beam near one end of the antenna to establish a first reference point 60 on the ground. A plumb bob was dropped from a second point on the beam near a target 28 to establish a second reference point 62 on the ground. The distance D5 from the second reference point to the beam was measured at 1.5907 m. The distance D6 from the first reference point to the beam was measured at 0.9493 m. The boresight 64 of the antenna points away from the port side of the aircraft.

FIG. 5 is a schematic representation of apparatus used to make geolocation measurements of the reference points established for the starboard side geometry. A first GPS device 70 was positioned over the first reference point 50, and the distance D8 between the first GPS device antenna and the first reference point 50 was measured as 0.1175 m. A second GPS device 72 was positioned over the second reference point 52, and the distance D7 between the second GPS device antenna and the second reference point 52 was measured as 2.5289 m. The distance D9 between the two reference points was then determined to be 496.13 m.

FIG. 6 is a schematic representation of apparatus used to make geolocation measurements of the reference points established for the port side geometry. A first GPS device 70 was positioned over the first reference point 60, and the distance D11 between the first GPS device antenna and the first reference point 60 was measured as 0.1175 m. A second GPS device 72 was positioned over the second reference point 62, and the distance D10 between the second GPS device antenna and the second reference point 62 was measured as 2.5368 m. The distance D12 between the two reference points was then determined to be 496.10 m.

Data reduction was performed using the LN260 and GPS data to determine the misalignment between the LN260 and the radar antenna in both heading and pitch. In this example, the radar is insensitive to roll errors of less than two degrees, which is well within the mechanical tolerance of the INU installation, so roll calibration is not required. The data reduction can be implemented using a routine that determines the heading and pitch between two points given their geodetic position (i.e., latitude, longitude, and elevation above the WGS-84 reference ellipsoid). Since the heading and pitch values are determined from the geodetic position of the antenna and target, the accuracy of the calibration depends on the fidelity of the position data and the distance between the antenna and target according to the relationship: $\epsilon = \delta/D$: where $\epsilon$ is the angle uncertainty of the heading or pitch, $\delta$ is the uncertainty of the position data in the latitude/longitude plane for heading or uncertainty of the geodetic elevation data for pitch, and D is the distance between the reference point on the antenna and the reference point (e.g., laser spot) on the target sheet. For the case shown, the relative position uncertainty of the reference/antenna points was less than 10 cm. Therefore, the 496.10 meter separation between the points ensured that the heading and pitch angles of the antenna were determined with less than 2 milliradians of angular error (0.012 degrees).

The antenna was calibrated on both the port and starboard orientations to evaluate whether the antenna face was perfectly parallel to its axis of rotation.

The true heading and pitch of the antenna was determined with much greater accuracy than can be expected from previous methods both from precision and specification standpoints. This technique is simpler, less expensive, and can be done in-house in less time than traditional techniques.

While the invention has been described in terms of a particular example, it will be apparent to those skilled in the art that various changes can be made to the described example without departing from the scope of the invention as set forth in the following claims.

What is claimed is:

1. A method for calibrating a sensor mounted on an aircraft, the method comprising the steps of:
    using an optical device to create reference points which define a reference line that is parallel to both horizontal and vertical planes of the sensor; and
    using the reference line to calibrate the sensor with respect to a reference coordinate system by sending an orient message to an inertial navigation unit reflecting corrections that force the inertial navigation unit to report its heading and pitch in a coordinate frame of the sensor.

2. The method of claim 1, wherein the step of using the reference line to calibrate the sensor with respect to a reference coordinate system comprises the step of:
    adding corrections to heading and pitch angles reported by an inertial navigation unit.

3. The method of claim 1, wherein:
    the reference coordinate system is established by an inertial navigation system.

4. The method of claim 1, wherein:
    the reference line is parallel to a horizontal plane of the sensor and a vertical plane of the sensor.

5. The method of claim 1, wherein the sensor comprises: an antenna.

6. The method of claim 5, wherein the antenna comprises: a planar array of elements.

7. A method for calibrating a sensor mounted on an aircraft, the method comprising the steps of:
    using an optical device to create reference points which define a reference line that is parallel to both horizontal and vertical planes of the sensor;
    using the reference line to calibrate the sensor with respect to a reference coordinate system by directing an optical beam through first and second irises connected to the sensor; and
    using the optical beam to establish first and second reference points.

8. The method of claim 7, further comprising:
    determining the locations of the first and second reference points.

9. The method of claim 8, wherein the locations of the first and second reference points are determined using a global positioning system.

10. The method of claim 7, wherein the step of using the reference line to calibrate the sensor with respect to a reference coordinate system comprises the step of:
    adding corrections to heading and pitch angles reported by an inertial navigation unit.

11. The method of claim 7, wherein:
    the reference coordinate system is established by an inertial navigation system.

12. The method of claim 7, wherein:
    the reference line is parallel to a horizontal plane of the sensor and a vertical plane of the sensor.

13. The method of claim 7, wherein the sensor comprises: an antenna.

14. The method of claim 13, wherein the antenna comprises:
    a planar array of elements.

* * * * *

UNITED STATES PATENT AND TRADEMARK OFFICE
CERTIFICATE OF CORRECTION

| | | |
|---|---|---|
| PATENT NO. | : 7,558,688 B2 | Page 1 of 1 |
| APPLICATION NO. | : 11/737924 | |
| DATED | : July 7, 2009 | |
| INVENTOR(S) | : Roy Schering et al. | |

It is certified that error appears in the above-identified patent and that said Letters Patent is hereby corrected as shown below:

Title Page
*Primary Examiner* – Carol S. Tsai
*Assistant Examiner* – Mary C. Baran Column 1, Lines 6-8; Statement of Government Interest
Delete the entire paragraph and insert the following:
--This invention was made with Government Support Under Contract No. FA8708-06-D-0001 awarded by the United States Air Force. The United States Government has rights in this invention under the contract.--

Column 4, Line 6
The geolocation of the [[references]] reference points is used to determine the heading and pitch of the reference line (block 44).

Column 4, Line 42
"...the port side (these are the [[set]] sets of irises that were mounted 11..."

Signed and Sealed this
Twenty-ninth Day of November, 2011

David J. Kappos
*Director of the United States Patent and Trademark Office*